(12) United States Patent
Lomel

(10) Patent No.: US 8,859,816 B2
(45) Date of Patent: Oct. 14, 2014

(54) METHOD FOR PRODUCING POLYAMIDE

(75) Inventor: Sébastien Lomel, Saint-Just-Chaleyssin (FR)

(73) Assignee: Rhodia Operations, Aubervilliers (FR)

( * ) Notice: Subject to any disclaimer, the term of this patent is extended or adjusted under 35 U.S.C. 154(b) by 78 days.

(21) Appl. No.: 13/812,068

(22) PCT Filed: Jul. 12, 2011

(86) PCT No.: PCT/EP2011/061806
§ 371 (c)(1),
(2), (4) Date: Jan. 24, 2013

(87) PCT Pub. No.: WO2012/013481
PCT Pub. Date: Feb. 2, 2012

(65) Prior Publication Data
US 2013/0131381 A1    May 23, 2013

(30) Foreign Application Priority Data

Jul. 27, 2010   (FR) ..................... 10 56158

(51) Int. Cl.
*C08G 69/28* (2006.01)
*C08G 69/26* (2006.01)
*C08G 69/04* (2006.01)

(52) U.S. Cl.
CPC ............... *C08G 69/28* (2013.01); *C08G 69/04* (2013.01)
USPC ......................................... 564/138; 564/153

(58) Field of Classification Search
CPC ....... C08G 69/28; C08G 69/26; C08G 69/265
USPC .................................................. 564/138, 153
See application file for complete search history.

(56) References Cited

U.S. PATENT DOCUMENTS

| | | | |
|---|---|---|---|
| 3,257,173 | A | 6/1966 | Parnell |
| 2001/0012883 | A1 | 8/2001 | Tanaka et al. |

FOREIGN PATENT DOCUMENTS

| | | |
|---|---|---|
| EP | 0 530 592 A2 | 3/1993 |
| FR | 1 449 694 | 7/1966 |
| GB | 1 093 203 | 11/1967 |
| JP | 64-051433 A | 2/1989 |
| JP | 2002-220463 A | 8/2002 |
| JP | 2004-204027 A1 | 7/2004 |

OTHER PUBLICATIONS

International Search Report issued on Sep. 12, 2011, by the European Patent Office as the International Searching Authority in International Patent Application No. PCT/EP2011/061806.

*Primary Examiner* — Shailendra Kumar
(74) *Attorney, Agent, or Firm* — Dentons US LLP

(57) ABSTRACT

A process for the manufacture of polyamide is described. Also described, is a process comprising a stage of initial polymerization under pressure starting from monomers and a stage of finishing in the liquid phase at atmospheric pressure. The finishing stage can employ an injection of inert gas along a direction essentially parallel to that of the flow of the liquid reaction stream.

11 Claims, 1 Drawing Sheet

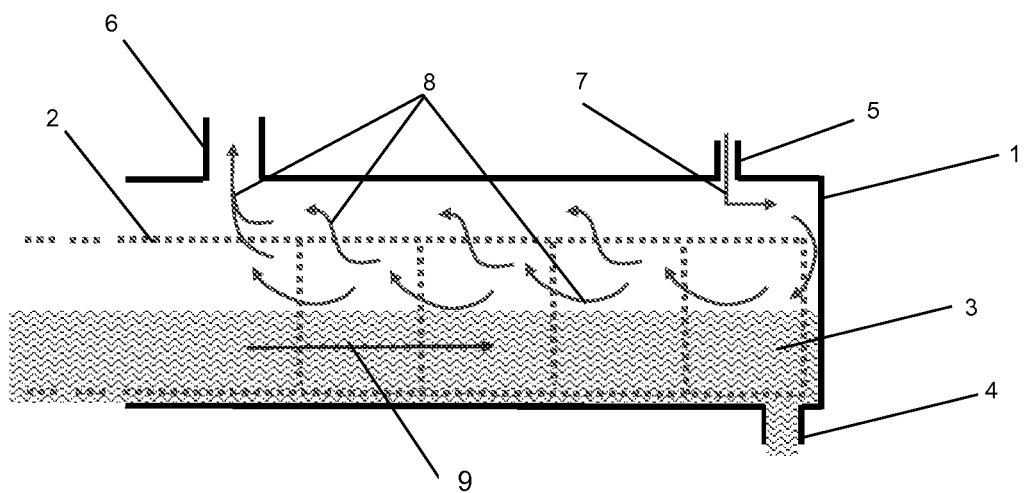

METHOD FOR PRODUCING POLYAMIDE

CROSS-REFERENCE TO PRIOR APPLICATIONS

This application is a National Stage of PCT/EP2011/061806, filed Jul. 12, 2011, and designating the United States (published in English on Feb. 2, 2012, as WO 2012/013481 A1), which claims priority to FR 10/56158, filed Jul. 27, 2010, each hereby expressly incorporated by reference in its entirety and each assigned to the assignee hereof.

The present invention relates to a process for the manufacture of polyamide. It more particularly relates to a process comprising a stage of initial polymerization under pressure starting from monomers and a stage of finishing in the liquid phase at a pressure in the vicinity of atmospheric pressure, the finishing stage employing an injection of inert gas along a direction essentially parallel to that of the flow of the liquid reaction stream and in the direction of this flow.

The polyamide is of the type of those obtained by polycondensation starting from diacids and diamines and/or of the type of those obtained by polycondensation starting from lactams and/or amino acids. The process is entirely suitable for the manufacture of poly(hexamethylene adipamide).

Polyamides are polymers of considerable industrial and commercial importance. Thermoplastic polyamides are obtained either by reaction between two different monomers or by polycondensation of just one monomer. The invention applies, on the one hand, to polyamides resulting from two different monomers, the most important polyamide of which is poly(hexamethylene adipamide). Of course, these polyamides can be obtained from a mixture of diacids and diamines. Thus, in the case of poly(hexamethylene adipamide), the main monomers are hexamethylenediamine and adipic acid. However, these monomers can comprise up to 25 mol % of other diamine or diacid monomers or even amino acid or lactam monomers. The invention applies, on the other hand, to polyamides resulting from just one monomer, the most important polyamide of which is polycaprolactam. Of course, these polyamides can be obtained from a mixture of lactams and/or amino acids. In the case of polycaprolactam, the main monomer is caprolactam. However, these monomers can comprise up to 25 mol % of other amino acid or lactam monomers or even diamine or diacid monomers.

The class of polyamide resulting from two different monomers is generally manufactured by using, as starting material, a salt obtained by mixing, in a stoichiometric amount, a diacid with a diamine, generally in a solvent, such as water.

Thus, in the manufacture of poly(hexamethylene adipamide), adipic acid is mixed with hexamethylenediamine, generally in water, in order to obtain hexamethylenediammonium adipate, better known under the name of Nylon salt or "N salt".

The solution of N salt is optionally concentrated by partial or complete evaporation of the water.

The class of polyamide resulting from just one monomer is generally manufactured by using, as starting material, a lactam and/or an amino acid, and a small amount of water; the proportion by weight of water is generally between 1 and 15%.

The polyamide is obtained by heating, at high temperature and high pressure, an aqueous solution of the monomers (for example, a solution of Nylon salt as described above) or a liquid comprising the monomers, in order to evaporate the water and/or the liquid while avoiding the formation of solid phase.

Several processes using different types of devices are known for the manufacture of polyamides.

Processes are known during which the polycondensation is carried out in the molten phase comprising the solution of N salt or the liquid comprising the monomers, the reaction stream flowing at low speed through the lower part of a horizontal-axis reactor. The upper part of the reactor comprises steam evaporated from the initial solution or produced by the polycondensation reaction. The molten reaction stream is in the presence of a gas phase which exhibits essentially the same pressure throughout the reactor. The steam is partially evacuated, so as to control the pressure. The polycondensation reaction is thus carried out at a pressure of approximately 0.5-2.5 MPa and at a temperature of approximately 215-300° C. The reaction stream is subsequently subjected to a nonadiabatic reduction in pressure down to atmospheric pressure by passing through a flasher, that is to say a heated tubular device exhibiting a sufficient exchange surface area to prevent crystallization of the product. During this operation, residual water present in the material stream is evaporated. The vapour and the liquid stream are subsequently separated in a gas/liquid separator. The polycondensation is continued in the molten phase at atmospheric or reduced pressure so as to achieve the desired degree of progression.

Other processes are known during which the polycondensation is carried out in the molten phase in a tubular reactor exhibiting a high length/diameter ratio. The reaction stream flows at high speed, occupying the entire cross section of the reactor. The hydrodynamic state of this reactor is such that the steam resulting from the reaction medium is mixed with the stream of molten material, for example in the form of bubbles. The speed, the composition, the pressure and the temperature of the steam gas phase vary along the reactor. The surface area for exchange between reaction medium and heat-exchange fluid is high, which promotes transfers of heat. The residence times are generally shorter than in the processes described above.

The stream of molten material undergoes polycondensation, releasing steam. It undergoes a gradual reduction in pressure along the reactor by head loss.

The polyamide exits from the coil at atmospheric pressure with an intermediate degree of progression of polymerization; its increase in mass subsequently continues during a final finishing stage. These processes exhibit the advantage of employing highly compact plants and of being very easy to carry out.

The molecular weight of the polyamide after the initial polymerization under pressure is not very high and the finishing stage makes it possible to continue the polymerization in order to prepare a polyamide with the desired degree of polymerization which can be used, for example, in the manufacture of yarns, moulded articles, and the like.

The efficiency of this finishing stage is conditioned in particular by the efficiency of the evacuation of the water produced by the polycondensation reaction. Specifically, the more efficiently this water is removed, the more the equilibrium of the polycondensation reaction is shifted in favour of the progression of the reaction and thus of a higher molecular weight.

Several finishing methods are known.

A first method is the finishing at atmospheric pressure according to which the autogenous gaseous headspace is mainly composed of steam. This method does not prove to be very efficient in terms of evacuation of the polycondensation water, which is reflected by a lower productive output of this method.

A second method is finishing under reduced pressure. This method makes possible more efficient evacuation of the polycondensation water and thus a better productive output of the finishing stage. However, according to this process under reduced pressure, care needs to be taken to suppress any entry of air into the finishing device, in order to prevent decomposition of the polymer by oxidation. Furthermore, this finishing method promotes fouling of the device. This process requires many precautions and is thus difficult to implement.

It is also known, in continuous processes for the preparation of polyamide, to inject an inert gas, such as nitrogen, into the finishing reactor. This method benefits from the same advantages as the vacuum finishing, namely a better productive output of the finishing stage, without exhibiting its disadvantages. Specifically, this method makes it possible to easily limit the risk of decomposition of hot polymer by eliminating the risk of entry of oxygen into the finishing reactor. The inert gas, which is generally dry, also makes it possible to remove the water produced during the polymerization reaction, which makes it possible to accelerate the latter.

The method and the conditions for introducing the inert gas into the finishing reactor have an influence in particular on the polymerization reaction which takes place during the finishing stage. There is consequently always a search for means for controlling and optimizing this polymerization reaction. Good control and good optimization of this polymerization reaction may make it possible to increase the productive output of this finishing stage and to improve the consistency of the characteristics of the polyamide, such as the viscosity.

Furthermore, there is always a search for flexible finishing processes which can be easily adjusted, for example according to the desired capacity of the industrial production lines, it being possible for this capacity to vary over time.

To this end, the invention provides a process for the continuous manufacture of a polyamide comprising a stage of initial polymerization under pressure starting from monomers and a stage of finishing in the liquid phase at a pressure in the vicinity of atmospheric pressure, the finishing stage being carried out in a horizontal-axis reactor, in the lower part of which a liquid reaction stream flows and in the upper part of which, the upper part being composed of a gaseous headspace above the liquid reaction stream, an inert gas is injected, characterized in that the inert gas is injected at the end of the finishing reactor, according to a direction essentially parallel to that of the flow of the liquid reaction stream and in the direction of this flow.

The term "pressure in the vicinity of atmospheric pressure" is understood to mean a pressure between atmospheric pressure and 1.5 times atmospheric pressure, advantageously a pressure between atmospheric pressure and 1.2 times atmospheric pressure.

The term "horizontal-axis reactor" is understood to mean a reactor, the axis of which forms an angle with the horizontal of at most 10°, advantageously of at most 5° and preferably of at most 3°.

The term "end" of the finishing reactor is understood to mean the part of the reactor situated between the vertical section of the reactor situated at an abscissa (the axis of the abscissae corresponding to the horizontal axis of the reactor) equal to 0.8*L, L being the length of the reactor (the abscissa 0 corresponding to the inlet of the reactor and the abscissa 1 L corresponding to the outlet of the reactor), and the vertical section of the reactor situated at a distance of 0.5 cm, preferably of 1 cm and more preferably still of 5 cm, with respect to the vertical wall which terminates the reactor.

The term "a direction essentially parallel to that of the flow" is understood to mean that this direction of injection can vary by an angle of +/−45°, preferably of +/−30°, with respect to the axis corresponding to the direction of the flow of the liquid reaction stream, without, however, departing from the scope of the invention.

The manufacturing process according to the invention is a process for the manufacture of polyamides of the type of those obtained from dicarboxylic acids and diamines and/or of the type of those obtained by polycondensation from lactams and/or amino acids.

The lactam or amino acid monomers can, for example, be chosen from caprolactam, 6-aminohexanoic acid; 5-aminopentanoic acid, 7-aminoheptanoic acid, 11-aminoundecanoic acid or dodecanolactam. The preferred lactam is caprolactam.

The dicarboxylic acid monomers can, for example, be chosen from glutaric acid, adipic acid, suberic acid, sebacic acid, dodecanedioic acid; 1,2- or 1,3-cyclohexanedicarboxylic acid; 1,2- or 1,3-phenylenediacetic acid; 1,2- or 1,3-cyclohexanediacetic acid; isophthalic acid; terephthalic acid; 4,4'-benzophenonedicarboxylic acid; 2,5-naphthalenedicarboxylic acid; p-(tert-butyl)isophthalic acid; and the alkaline salts of 5-sulphoisophthalic acid. The preferred dicarboxylic acid is adipic acid.

The diamine monomers can, for example, be chosen from hexamethylenediamine; butanediamine; pentanediamine; 2-methylpentamethylene-diamine; 2-methylhexamethylenediamine; 3-methylhexamethylenediamine; 2,5-dimethylhexamethylenediamine; 2,2-dimethylpentamethylenediamine; heptane-diamine; nonanediamine; 5-methylnonanediamine; dodecamethylenediamine; 2,2,4- and 2,4,4-trimethylhexamethylenediamine; 2,2,7,7-tetramethyloctamethylenediamine; meta-xylylenediamine; para-xylylenediamine; isophoronediamine; diaminodicyclo-hexylmethane and $C_2$-$C_{16}$ aliphatic diamines which can be substituted by one or more alkyl groups. The preferred diamine is hexamethylenediamine.

The process of the invention is a continuous manufacturing process, the conversions taking place on streams of material. The streams of material undergo conversions during the various stages carried out in one or more devices. The process comprises at least the two successive stages described above, which are a stage of initial polymerization under pressure and a stage of finishing in the liquid phase at a pressure in the vicinity of atmospheric pressure. It can obviously comprise other stages upstream or downstream of them or even between them.

The main conversion carried out during the implementation of the process is generally the polymerization of a dicarboxylic acid with a diamine or of a lactam and/or amino acid. This conversion is well-known to a person skilled in the art, for example for the manufacture of polyamide 66 from adipic acid and hexamethylenediamine or for the manufacture of polyamide 6 from caprolactam. This polymerization, which is a polycondensation in the case of a dicarboxylic acid and a diamine, generally releases water in the vapour form.

The degree of progression of the polycondensation is defined as follows:

Degree of progression (%)=[(number of moles of amide units formed)/(number of moles of initial reactive functional groups in deficit)]*100

The number of moles of initial reactive functional groups in deficit is:
  either the number of moles of carboxylic acid functional groups resulting from the monomers initially present in the reaction medium, if the reactive functional groups in deficit initially in this medium are the carboxylic acid functional groups (with respect to the amine functional groups), or the number of moles of amine functional groups resulting from the monomers initially present in the reaction medium, if the reactive functional groups in deficit initially in this medium are the amine functional groups (with respect to the carboxylic acid functional groups).

Depending on the degree of progression of the polycondensation, the product obtained can be described as polyamide oligomer, polyamide prepolymer or polyamide.

The degree of progression of the polycondensation on conclusion of the stage of initial polymerization is advantageously greater than 60%, preferably greater than 90% and more preferably still greater than 95%.

The stage of initial polymerization of the process of the invention is known to a person skilled in the art. It generally comprises a phase of polymerization under pressure starting from the monomers and a phase of reducing the polymerization medium in pressure in order to remove water by evaporation.

The temperature and the pressure during the stage of initial polymerization are such that the stream of material does not solidify.

The polycondensation requires a supply of heat, the feed temperature generally being far below the melting point of the final polymer. The plants used for the implementation of the stage of initial polymerization thus comprise heat supply means for the purpose of maintaining the reaction medium at a sufficient temperature to prevent the appearance of a solid phase. They likewise comprise all the means which may be necessary for its implementation, such as pumps, analytical means, control means, valves, means for introducing or storing the stream of material, or static mixers.

The reactor, during the stage of initial polymerization, is maintained at a sufficient temperature for the polycondensation to take place. The reactor can advantageously be fed with a preheated stream of monomers, the temperature of which is close to the temperature at which polycondensation starts.

The pressure in the initial polymerization reactor is generally between 0.5 and 3.5 MPa and the temperature between 180 and 320° C.

The stream of polycondensation product is subsequently subjected to a reduction in pressure, in order to achieve a pressure generally in the vicinity of atmospheric pressure.

The polycondensation product resulting from the stage of initial polymerization is a molten polymer or prepolymer. It can comprise a vapour phase essentially composed of steam capable of having been formed and/or evaporated during the phase of reduction in pressure.

This product can be subjected to a stage of vapour phase separation.

This product is subsequently subjected to a stage of finishing in a liquid phase in order to achieve the desired degree of polycondensation. The finishing consists in maintaining the polycondensation product in the molten state, at a pressure in the vicinity of atmospheric pressure, for a sufficient time to achieve the desired degree of progression. Such an operation is known to a person skilled in the art. The temperature of the finishing stage is advantageously greater than or equal to 200° C. and in all cases greater than the temperature at which the polymer solidifies. The residence time of the liquid phase in the finishing reactor is advantageously greater than 1 minute, preferably greater than 5 min. It preferably does not exceed 60 minutes.

The plants used for the implementation of the finishing stage comprise heat supply means for the purpose of maintaining the reaction medium at a sufficient temperature to prevent the appearance of a solid phase. They likewise comprise all the means which may be necessary for its implementation, such as pumps, analytical means, control means, valves, means for introducing or of storing the stream of material, or static mixers.

The finishing reactor can be placed in an enclosure or jacket comprising a heat-exchange fluid.

The finishing reactor has a horizontal axis. It is generally a horizontal cylindrical reactor or a horizontal reactor with an oval cross section.

The length and the diameter of the reactor are chosen and the flow rate of the liquid reaction stream can be adjusted and controlled in order to obtain the desired degree of progression.

The length of the finishing reactor can be of the order of three times the internal diameter of the reactor.

The finishing reactor is partially filled with the liquid phase. Generally, the proportion of filling of the finishing reactor by the liquid phase is between 20 and 75% of the space initially available in the reactor.

The finishing reactor generally comprises a stirrer. The stirrer is mounted horizontally for the purpose of the rotation thereof inside the reactor. It can, for example, be an Archimedean screw, a stirrer of cage type, or successive discs, which may or may not be openwork, fitted to a shaft. The diameter of the stirrer is generally slightly less than the internal diameter of the finishing reactor. The axis of the stirrer can be off centre with respect to the axis of the finishing reactor. This makes possible in particular the movement of the gas phase in the reactor. This movement can also be provided by holes present, for example, in the discs of the stirrer. The rotational speed of the stirrer can, for example, be between 0.1 and 15 revolutions/min.

The stirrer can comprise several discs which define compartments in the finishing reactor. The stirrer can, for example, comprise between 5 and 15 discs. The final compartment of the finishing reactor corresponds to the space between the final disc of the shaft and the vertical wall which terminates the finishing reactor. Advantageously, when such a stirrer is employed in the context of the process of the invention, the injection of inert gas is carried out in the final compartment of the finishing reactor as defined above.

The finishing reactor comprises one or more orifices for the injection of an inert gas and one or more openings for the evacuation of the gases. Generally, the opening for the evacuation of gases lies in the first half of the finishing reactor. The orifice for injection of inert gas is generally situated downstream of the opening for the evacuation of the gases, with respect to the direction of flow of the liquid reaction stream.

Any device for injection of inert gas can be employed, insofar as it makes possible the injection of gas according to a direction essentially parallel to that of the flow of the liquid reaction stream and in the direction of this flow. The outlet of the gas injection device can consist of a rectangular slit directed towards the vertical wall which terminates the finishing reactor. Multipoint injection may also be involved.

The inert gas can be nitrogen, carbon dioxide or a rare gas, such as helium, argon or neon. The inert gas injected into the finishing reactor is preferably nitrogen. The inert gas is generally dry.

The inert gas can optionally be preheated before being injected into the finishing reactor. The preheating temperature is generally between 70 and 300° C.

The pressure for injection of the inert gas into the finishing reactor is advantageously slightly greater than the finishing pressure in the reactor.

Advantageously, the dilution factor for the steam in the headspace of the finishing reactor (part of the headspace situated between the opening for evacuation of the gases and the vertical wall terminating the finishing reactor), when the inert gas is introduced, is greater than 2.

This dilution factor F is defined according to the following formula:

$$F=\text{concentration of the steam before introduction of inert gas/concentration of the steam after introduction of inert gas}=(Q \text{ inert gas}+Q \text{ steam})/Q \text{ steam}, Q \text{ representing a flow rate in m}^3/\text{h}.$$

The flow rate Q of inert gas in the formula is calculated under the pressure and temperature conditions of the finishing reactor.

The dilution factor is calculated by considering solely the gaseous headspace of the region of the finishing reactor situated between the opening for evacuation of the gas and the vertical wall terminating the finishing reactor.

The flow rate of steam is evaluated from the calculation of the amount of polycondensation water generated in this region. This is evaluated from the number-average molar mass of the polymer at the inlet to this region, that is to say at the level of the opening for evacuating the gases, and from the number-average molar mass desired for the polymer at the outlet of the finishing reactor. The number-average molar mass of the polymer at the level of the opening for evacuation of the gases, knowing the abscissa X (the axis of the abscissae corresponding to the horizontal axis of the finisher) of this opening, is estimated to a first approximation by using the following relationship:

$$Mn(X)=Mn(X=0)+[Mn(X=1)-Mn(X=0)]*X$$

with X=0 corresponding to the inlet of the finisher and X=1 to the outlet of the finisher, Mn being a number-average molar mass.

Advantageously, the residence time of the gas phase in the finishing reactor (part of the reactor situated between the opening for evacuation of the gases and the vertical wall terminating the finishing reactor) is less than or equal to 30 min and preferably less than or equal to 20 min.

The residence time t is defined according to the following formula:

$$t=V \text{ headspace of the reactor}/(Q \text{ inert gas}+Q \text{ steam}), V \text{ representing a volume in m}^3 \text{ and } Q \text{ representing a flow rate in m}^3/\text{h}.$$

The residence time of the gas phase is calculated by considering solely the gaseous headspace of the region of the finishing reactor situated between the opening for evacuation of the gas and the vertical wall terminating the finishing reactor. The steam flow rate and the inert gas flow rate are determined as described above for the dilution factor.

The polyamide obtained at the end of the finishing stage can be cooled and put into the form of granules. It preferably exhibits, after the finishing stage, a degree of progression of polycondensation of greater than 99%.

The polyamide obtained by the process of the invention in the molten form can be directly formed or can be extruded and granulated for an optional postcondensation stage and/or for subsequent forming after melting.

The polyamide can be used for a large number of applications, in particular for the manufacture of yarns, fibres or filaments or for the forming of articles by injection moulding or extrusion. It can in particular be used in engineered plastic compositions.

The process of the invention has numerous advantages. The process of the invention makes it possible to control and to optimize the polycondensation reaction during the finishing stage. Thus, the productive output of this finishing stage is improved and the molecular weight of the polyamide is controlled by virtue of the process of the invention.

Furthermore, the process of the invention is flexible since it is easily adjusted, for example, to a variation in the capacity of the industrial production line.

A diagram of a finisher operating according to a process in accordance with the process of the invention, which is illustrative and without any limiting nature, is represented in FIG. 1.

Other details or advantages of the invention will become more clearly apparent in the light of the examples given below.

EXAMPLES

The nitrogen flow rates mentioned in the examples are measured at ambient temperature.

BRIEF DESCRIPTION OF THE FIGURE

FIG. 1 represents a finisher 1 equipped with a stirrer 2, in the lower part of which flows a liquid reaction stream 3 which is evacuated via an outlet opening for the liquid stream 4. The upper part of the finisher is composed of a gaseous headspace. The inert gas is injected via a gas injection orifice 5 along a direction 7, that is to say according to a direction parallel to that of the flow of the liquid reaction stream 9 and in the direction of this flow. The inert gas moves diagrammatically along the direction of movement 8, before being evacuated via the opening for evacuation of the gases 6.

COMPARATIVE EXAMPLE 1

A stream of approximately 20 t/d of liquid polyamide 66 prepolymer with a number-average molar mass of 5600 g/mol, obtained according to a standard process for prepolymerization of polyamide 66 type, is introduced at a temperature in the vicinity of 280° C. into a horizontal finisher comprising a horizontal stirrer (successive discs fitted to a shaft), operating at a pressure of 1020 hPa and equipped with an outlet for the vapour phase situated in the middle of the finisher. A flow rate of 2 m$^3$/h of dry nitrogen is also introduced into this finisher, according to a multipoint (2) injection, through an orifice situated between the final disc of the stirrer and the vertical wall which terminates the finisher, along a vertical direction orthogonal to the direction of the flow of the liquid stream. Under these pressure and temperature conditions, the dilution factor F is 4.3 and the residence time of the gas phase t is 17.1 minutes. A polymer with a number-average molar mass equal to 16 400 g/mol is extracted from this finisher, which makes possible satisfactory operation of the coupled spinning machine.

It is desired to increase the capacity of the line. The flow rate of polymer extracted from the finisher is then increased by increasing the overall flow rate of the line and its number-average molar mass is regulated by setting the level setpoint of the finisher at the maximum and by increasing the nitrogen flow rate. The gradual increase in the nitrogen flow rate up to the value of 5 m$^3$/h does not make it possible to maintain the number-average molar mass of the polymer, which falls as a function of the polymer flow rate, down to 15 100 g/mol when the polymer flow rate is doubled. A polymer with such as molar mass does not make possible stable operation of the spinning machine; the quality of the polymer thus deteriorates, which results in particular in breakages. On adopting these nitrogen injection conditions of 5 m$^3$/h, the dilution factor F is 5.1 and the residence time of the gas phase t is 5.6 minutes. The increase in the nitrogen flow rate up to a value of greater than 7 m³/h does not result in any increase in the mass of the polymer. The nitrogen flow rate is then adjusted to 10 m³/h, i.e. F=9.8 and t=3.1 minutes: the molar mass of the polymer in this case increases uncontrollably, up to a value of 19 350 g/mol, rendering the polymer at the finisher outlet unworkable due to an excessively high mass and consequently an excessively high viscosity.

EXAMPLE 1

In the finisher of Comparative Example 1 operating with the same prepolymer stream of approximately 20 t/d, the injection of nitrogen is modified so as to introduce the latter along a direction parallel to that of the flow of the liquid stream and in the direction of this flow. For the same operating conditions of the polycondensation line, the adoption of a nitrogen flow rate of 2 m³/h, i.e. F=4.4 and t=17.1 min, under the pressure and temperature conditions of the finisher makes possible a significant increase in the mass of the polymer, which reaches 16 800 g/mol and thus allows even more stable running of the spinning machines.

A stream of approximately 40 t/d of the same prepolymer as that of Comparative Example 1 is introduced into the finisher and the same conditions for running the polycondensation line are adopted. The adoption of a flow rate of 10 m³/h of nitrogen, i.e. F=9.4 and t=3.1 min, makes it possible to retain a polymer with a molar mass of 16 800 g/mol in a very stable way and guarantees very satisfactory operation of the spinning machines at the flow rate of 40 t/d of polymer for the production line. The process of the invention makes it possible to increase the capacity of the line in an easy and controlled way and to produce a yarn of high quality without waste.

COMPARATIVE EXAMPLE 2

A stream of 1.7 t/h of liquid polyamide 66 prepolymer with a viscosity index (VI) of 50 ml/g (measured with 0.5 g of prepolymer per 100 ml of 90% formic acid) obtained according to a standard process for prepolymerization of polyamide 66 type is introduced at a temperature in the vicinity of 280° C. into a horizontal finisher comprising a horizontal stirrer (successive discs fitted to a shaft), operating at a pressure of 1100 hPa and equipped with an outlet for the vapour phase situated in the middle of the finisher. A flow rate of 8 m³/h of dry nitrogen is also introduced into this finisher through an orifice situated between the final disc of the stirrer and the vertical wall which terminates the finisher, along a direction parallel to that of the flow of the liquid stream and in the opposite direction to that of this flow, using an injection device, the outlet of which consists of a rectangular slit. The level setpoint of the finisher is set at the maximum and a polymer is extracted from this finisher having a VI of 136 ml/g, which does not correspond to the product specification equal to 140 ml/g.

EXAMPLE 2

In the finisher of Comparative Example 2, the nitrogen injection is modified so as to introduce the nitrogen along a direction parallel to that of the flow of the liquid stream and in the direction of this flow.

By adopting the same operating conditions, whether this is at the level of the polycondensation or of the nitrogen injection (particularly the nitrogen flow rate), the VI measured at the finisher outlet is 140 ml/g.

The process of the invention makes it possible to produce a polymer perfectly suited to the specification of the product.

The invention claimed is:

1. A process for the continuous manufacture of a polyamide, the process comprising initial polymerization under pressure starting from monomers and finishing in a liquid phase at a pressure in a vicinity of atmospheric pressure, wherein the finishing is carried out in a horizontal-axis reactor, in the lower part of which a liquid reaction stream flows and in the upper part of which, the upper part being composed of a gaseous headspace above a liquid reaction stream, injecting an inert gas, wherein the inert gas is injected at the end of the finishing reactor, according to a direction essentially parallel to that of the flow of the liquid reaction stream and in the direction of this flow.

2. The method as defined by claim 1, wherein the monomers are a dicarboxylic acid and a diamine.

3. The method as defined by claim 1, wherein the polyamide is a polyamide 66 or a copolyamide, the majority of the repeat units of which are polyamide 66 units, the dicarboxylic acid being adipic acid and the diamine being hexamethylenediamine.

4. The method of as defined by claim 1, wherein the monomers are a lactam and/or an amino acid.

5. A method as defined by claim 4, wherein the polyamide is a polyamide 6 or a copolyamide, the majority of the repeat units of which are polyamide 6 units, the lactam being caprolactam and/or the amino acid being aminohexanoic acid.

6. The method as defined by claim 1, wherein a degree of progression of polycondensation at an outlet of the initial polymerization is greater than 90% for a polyamide 66.

7. The method as defined by claim 1, wherein the dilution factor for steam in the headspace of a finishing reactor, when the inert gas is introduced, is greater than 2.

8. The method as defined by claim 1, wherein residence time of a gas phase in a finishing reactor is less than or equal to 30 min.

9. The method as defined by claim 1, wherein a residence time of a liquid phase in a finishing reactor is greater than 5 minutes.

10. The method as defined by claim 1, wherein an initial polymerization reactor and a finishing reactor are placed in an enclosure or jacket comprising a heat-exchange fluid.

11. The method as defined by claim 8, wherein the residence time of the gas phase in the finishing reactor is less than or equal to 20 min.

* * * * *